US009593637B2

(12) United States Patent
Surnilla et al.

(10) Patent No.: US 9,593,637 B2
(45) Date of Patent: Mar. 14, 2017

(54) METHOD OF DIAGNOSING INJECTOR VARIABILITY IN A MULTIPLE INJECTOR SYSTEM

(71) Applicant: Ford Global Technologies, LLC, Dearborn, MI (US)

(72) Inventors: Gopichandra Surnilla, West Bloomfield, MI (US); Adithya Pravarun Re Ranga, Ann Arbor, MI (US); Mark Meinhart, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 370 days.

(21) Appl. No.: 14/098,363

(22) Filed: Dec. 5, 2013

(65) Prior Publication Data

US 2015/0159578 A1 Jun. 11, 2015

(51) Int. Cl.
*F02D 41/30* (2006.01)
*F02D 41/00* (2006.01)
(Continued)

(52) U.S. Cl.
CPC ....... *F02D 41/3094* (2013.01); *F02D 19/061* (2013.01); *F02D 19/0623* (2013.01);
(Continued)

(58) Field of Classification Search
CPC .. F02D 19/0644; F02D 19/0647; F02D 41/30; F02D 41/3076; F02D 41/3094;
(Continued)

(56) References Cited

U.S. PATENT DOCUMENTS 5,535,621 A * 7/1996 Glidewell ............. F02D 41/221
123/478
6,349,702 B1 2/2002 Nishiyama
(Continued)

FOREIGN PATENT DOCUMENTS

| EP | 2453123 A1 | 5/2012 |
| EP | 1921304 B1 | 11/2012 |
| EP | 2258937 A1 | 12/2012 |

OTHER PUBLICATIONS

Cortese, Mary E., "A Study of Rail Pressure Variation for Various Fuel Injectors on a Simple Rail Design Over the Engine Operation Range," SAE Technical Paper Series 2004-01-2937, Powertrain & Fluid Systems Conference & Exhibition, Tampa, F.L., Oct. 25-28, 2004, 27 pages.

(Continued)

*Primary Examiner* — John Kwon
*Assistant Examiner* — Johnny H Hoang
(74) *Attorney, Agent, or Firm* — Julia Voutyras; John D. Russell; B. Anna McCoy

(57) ABSTRACT

Various systems and methods are described for diagnosing injector variability in a dual fuel, multi-injector system. In one example, a single injector in one cylinder is enabled while remaining cylinders are fueled with a first fuel and subsequently, a second fuel is injected via the enabled injector into the one cylinder in a predetermined sequence and fuel rail pressure drops are measured. Further, measured pressure drop after each injection event is corrected for an increase in injector closing delay.

20 Claims, 7 Drawing Sheets

(51) Int. Cl.
  *F02D 41/22* (2006.01)
  *F02D 41/24* (2006.01)
  *F02D 19/06* (2006.01)
  *F02D 41/38* (2006.01)
  *F02D 13/02* (2006.01)

(52) U.S. Cl.
  CPC ..... *F02D 19/0628* (2013.01); *F02D 19/0692* (2013.01); *F02D 41/008* (2013.01); *F02D 41/0025* (2013.01); *F02D 41/221* (2013.01); *F02D 41/2467* (2013.01); *F02D 41/3076* (2013.01); *F02D 13/0207* (2013.01); *F02D 13/0219* (2013.01); *F02D 41/3845* (2013.01); *F02D 2200/06* (2013.01); *F02D 2200/0602* (2013.01); *F02D 2200/0618* (2013.01); *Y02T 10/36* (2013.01); *Y02T 10/40* (2013.01)

(58) Field of Classification Search
  CPC ...... F02D 2200/0602; F02D 2041/224; F02M 55/025; F02M 63/0225; F02M 63/0265; F02M 63/0275; Y02T 10/36
  USPC .... 701/103–105; 123/1 A, 27 GE, 299, 304, 123/445–447, 456, 479, 495, 525, 123/575–578; 73/114.45, 114.51
  See application file for complete search history.

(56) References Cited

U.S. PATENT DOCUMENTS

| | | | |
|---|---|---|---|
| 6,964,261 B2 | 11/2005 | Warne et al. | |
| 7,717,088 B2 | 5/2010 | Thomas | |
| 7,886,719 B2 * | 2/2011 | Thomas | F02D 41/402 123/299 |
| 8,118,006 B2 | 2/2012 | Pursifull | |
| 2013/0013174 A1 * | 1/2013 | Nistler | F02D 41/123 701/112 |
| 2013/0013175 A1 * | 1/2013 | Nistler | F02D 41/22 701/112 |
| 2013/0275026 A1 * | 10/2013 | Methil-Sudhakaran | F02M 65/003 701/103 |

OTHER PUBLICATIONS

Parotto, Marco et al., "Advanced GDI Injector Control with Extended Dynamic Range," SAE International Paper Series 2012-01-0258, Apr. 8, 2013, 9 pages.
Farooqi, Q.R. et al., "Real Time Monitoring of Diesel Engine Injector Waveforms for Accurate Fuel Metering and Control," Journal of Control Science and Engineering, vol. 2013, Article ID 973141, Apr. 24, 2013, 10 pages.

* cited by examiner

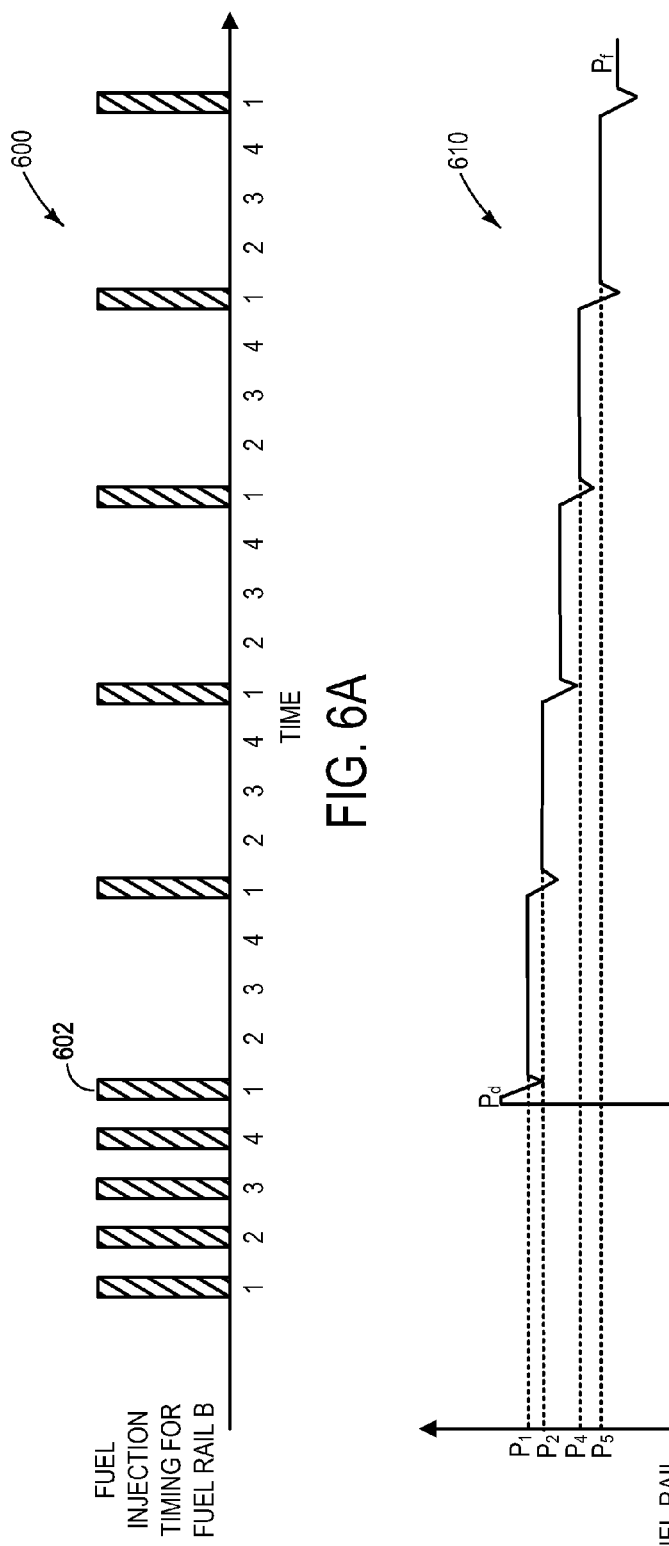
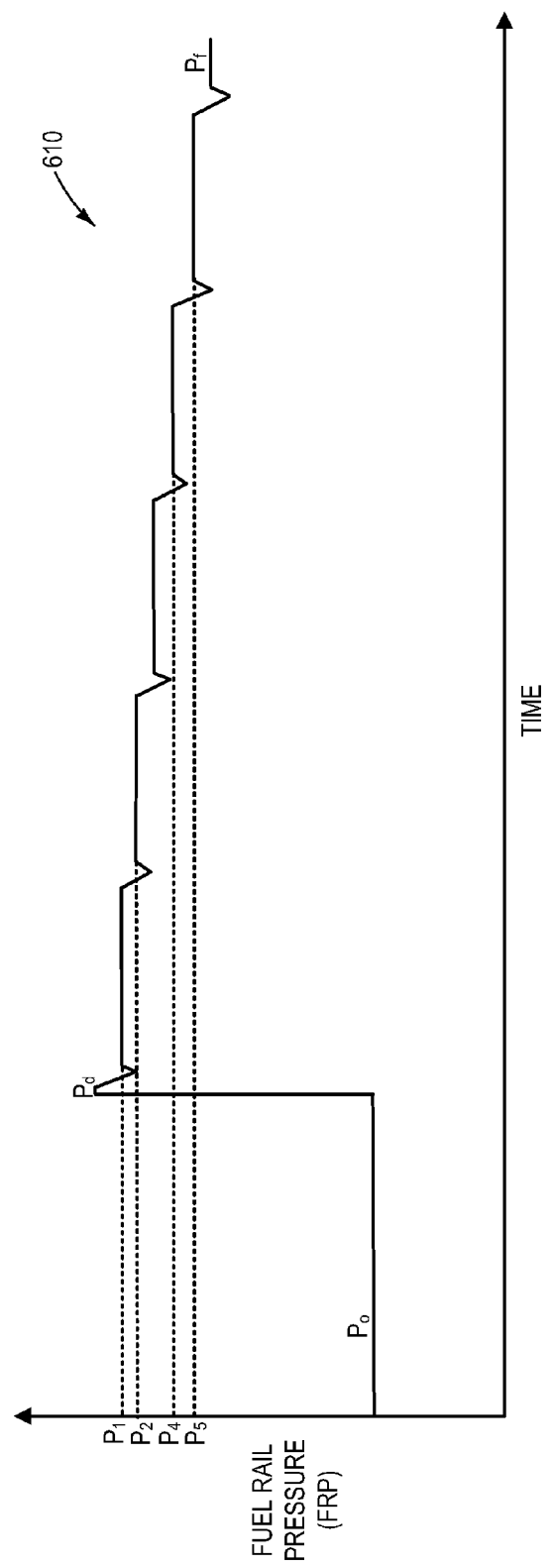

METHOD OF DIAGNOSING INJECTOR VARIABILITY IN A MULTIPLE INJECTOR SYSTEM

TECHNICAL FIELD

The present application relates to diagnosing injector variability in a fuel injection system in a dual fuel engine.

BACKGROUND AND SUMMARY

Fuel injectors often have piece-to-piece and time-to-time variability, due to imperfect manufacturing processes and/or injector aging, for example. Over time, injector performance may degrade (e.g., injector becomes clogged) which may further increase piece-to-piece injector variability. As a result, the actual amount of fuel injected to each cylinder of an engine may not be the desired amount and the difference between the actual and desired amounts may vary between injectors. Such discrepancies can lead to reduced fuel economy, increased tailpipe emissions, and an overall decrease in engine efficiency. Further, engines operating with a dual injector system, such as dual fuel or PFI/DI systems, may have even more fuel injectors (e.g., twice as many) resulting in a greater possibility for degradation of engine performance due to injector degradation. Diverse approaches may be used to estimate the variability in injector performance.

One example method is that used by Pursifull in U.S. Pat. No. 8,118,006 wherein injector variability in a dual fuel engine including a first and second fuel rail may be diagnosed by isolating one fuel injector at a time. For example, pumping of a second fuel into the second fuel rail is suspended while a first fuel is injected to all but a single cylinder of the engine, and, while pumping is suspended in the second fuel rail, the second fuel is injected into the single cylinder and corresponding pressure decrease in the second fuel rail is correlated to injector operation and possible degradation. Specifically, the measured pressure drop is compared with an expected decrease in pressure and associated with any of the following malfunctions: injector plugging, injector leakage and/or a complete failure of the injector.

The inventors herein have identified potential issues with the above approach. For example, during an injector calibration event, as an injector is tested, fuel rail pressure decreases. This decline in rail pressure may reduce injector backpressure causing an increase in injector closing delay and substantially affecting the accuracy of measured pressure drop. Further, if the calibration event occurs over a longer period of time, a larger overall drop in fuel rail pressure with a corresponding large increase in injector closing delay may affect the accuracy of pressure drop measurements substantially. Since measured pressure drops are correlated with an expected decrease to predict the presence (or absence) of injector degradation, inaccurate measurements can lead to incorrect conclusions about injector malfunction and subsequent fueling adjustments.

The inventors herein have recognized the above problem and have devised an approach to at least partially address it. In one example approach, a method is provided for measuring pressure drops with associated closing delays at each injection event and correcting the calculated pressure drops for an increase in injector closing delay. For example, in a multi-injector, dual-fuel system, a high pressure pump may be operated to temporarily raise pressure of a second fuel in a second rail coupled to an injector being tested. Once the pressure is at a predetermined level and after suspending pump operation, a single cylinder may be injected with a second fuel via a direct injector while other cylinders can be fueled with a first fuel via their respective port injectors. At each injection, a fuel rail pressure decrease may be measured along with an associated injector closing delay and then corrected for an increase in closing delay. For example, a percentage increase in closing delay at each rail pressure compared to that at base rail pressure may be calculated and the drop in rail pressure can then be corrected to accommodate for an increase in closing delay.

In this way, injector degradation, and consequently, injector variability, can be learned by measuring fuel rail pressure drops and adjusting these for a closing delay of an injector. In an engine with multiple injectors per cylinder, a single injector can be isolated for calibration by fueling all but one cylinder with a first fuel and injecting a second fuel into the single cylinder via the injector being calibrated. During the calibration, pressure drops, along with closing delays, associated with each injection event may be measured. By correcting for an increase in closing delay, a more accurate determination of pressure drop can be made, particularly when the overall pressure decline in the fuel rail is significant. As such, this corrected pressure drop will lead to a more precise adjustment in an amount of fuel delivered by the injector.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 6A and 6B show an example fuel injection timing and fuel rail pressure change during a diagnostic routine.

DETAILED DESCRIPTION

Figure 1:
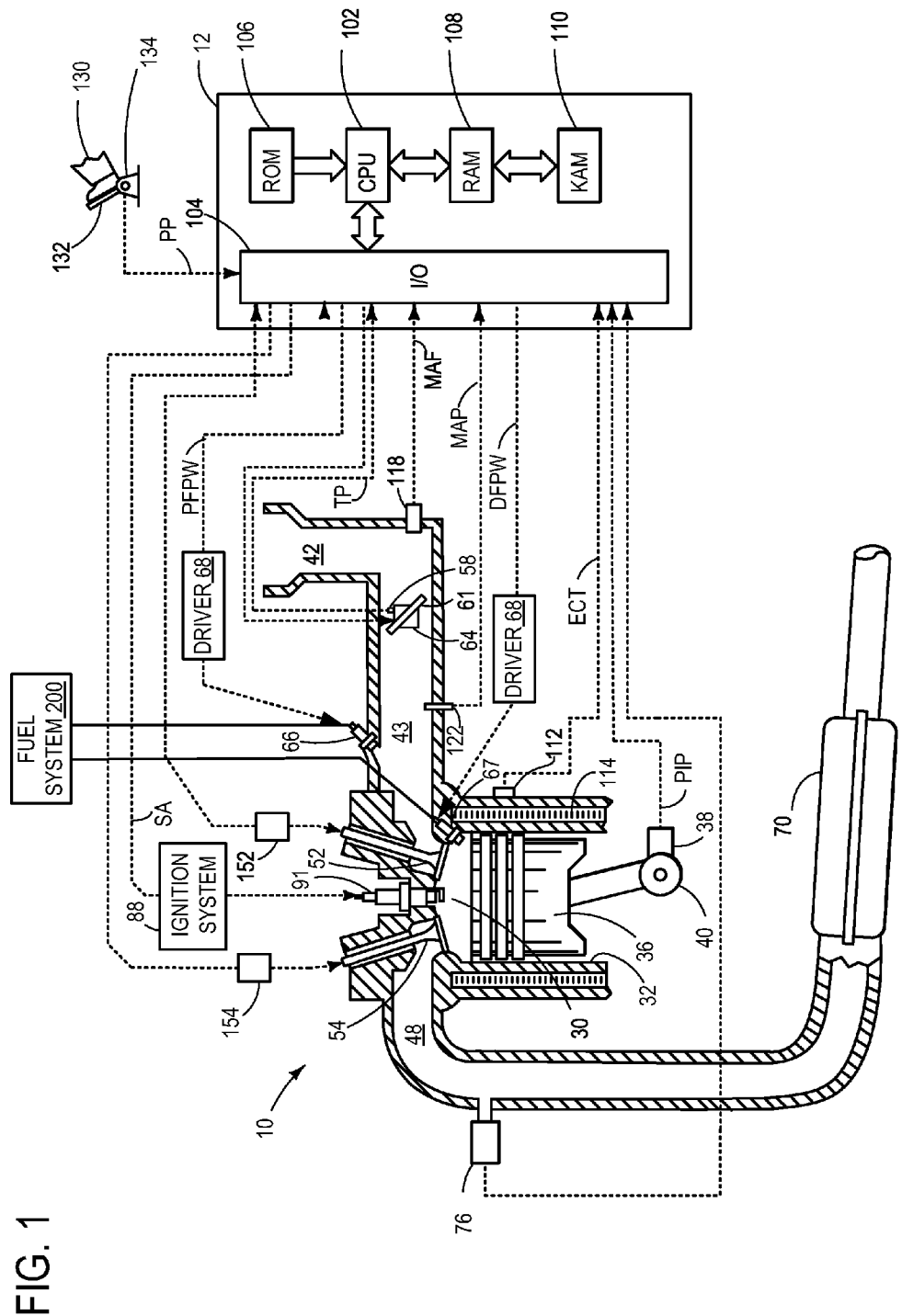
FIG. 1 portrays a schematic diagram of an engine.
Figure 2:
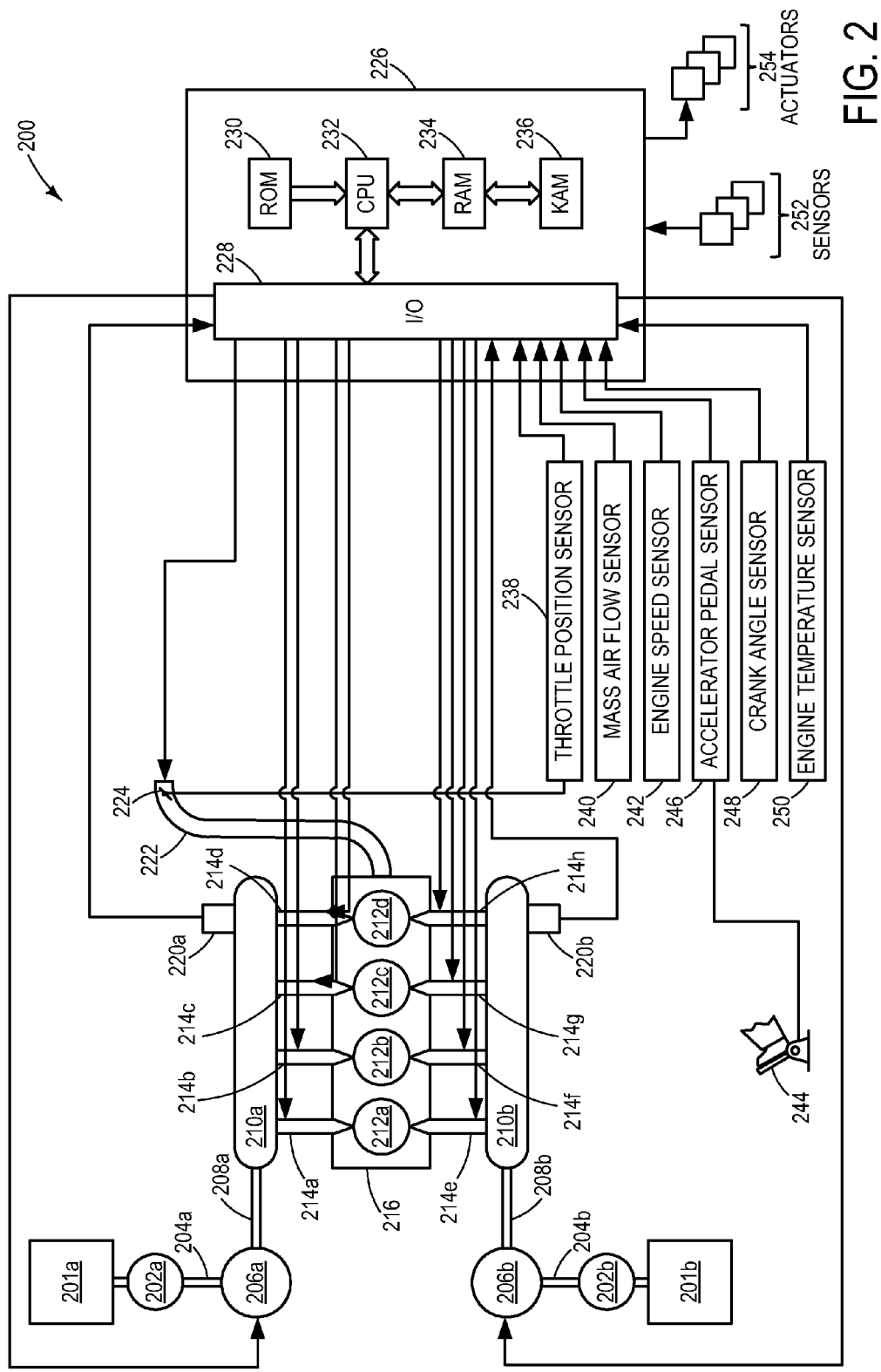
FIG. 2 depicts a schematic diagram of a dual fuel, dual injector system.
Figure 7:
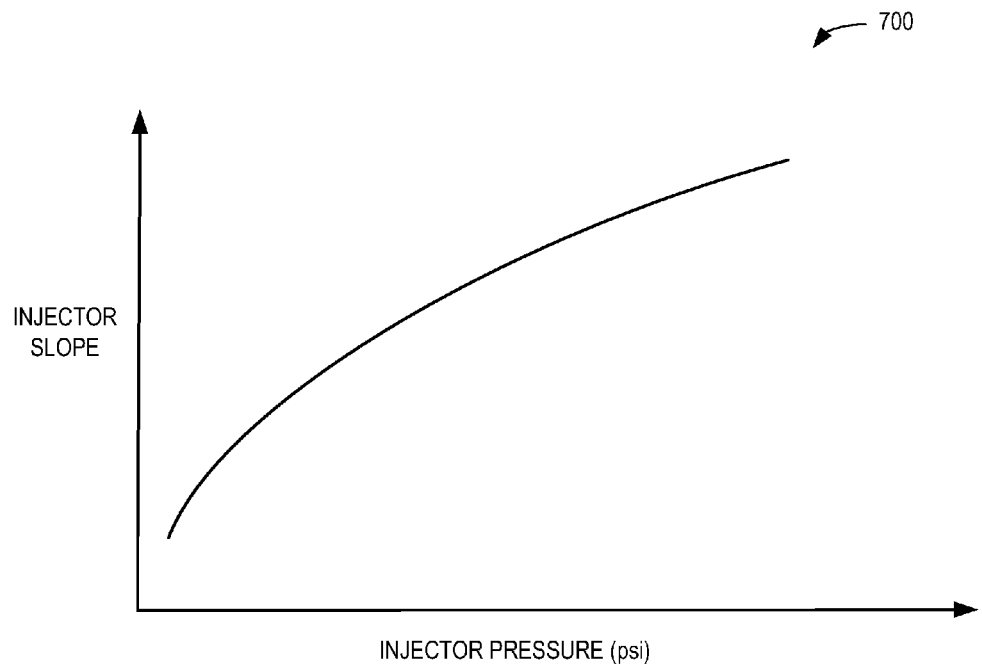
FIG. 7 depicts a map that shows the relationship between injection slope and injection pressure.
Figure 8:
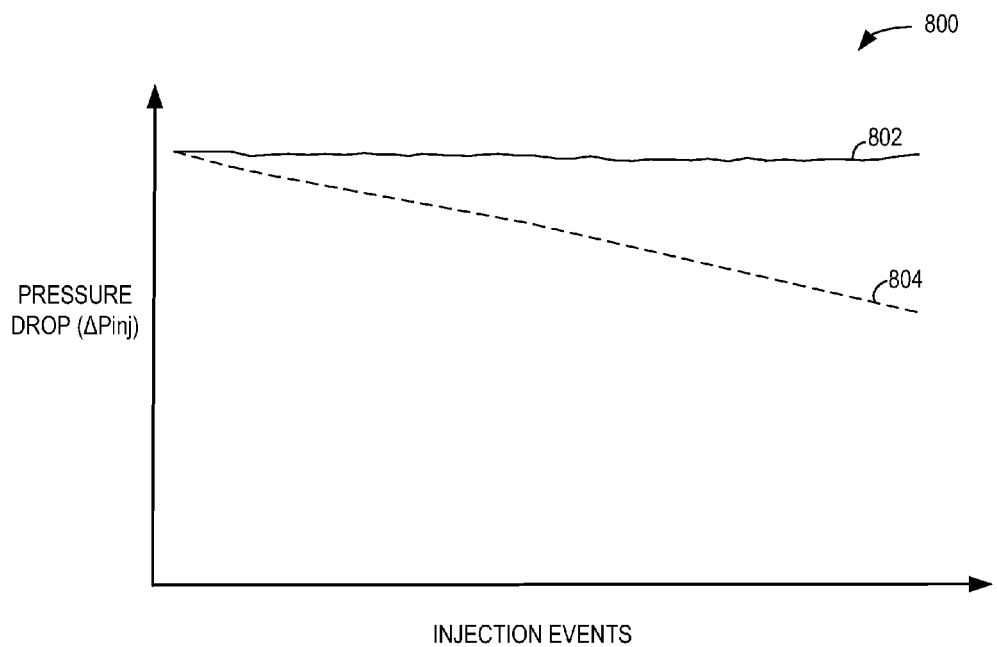
FIG. 8 shows a comparison of corrected and uncorrected pressure drops in relation to the number of injection events.

The following description relates to a method for controlling fuel injection in a multi-injector, multi-substance engine, such as a dual fuel engine, which includes first and second fuel rails and first and second fuel pumps as shown in FIG. 2. An example fuel system with two fuel injectors per cylinder, for at least one cylinder of a multi-cylinder engine is portrayed in FIG. 1. The two injectors may be configured in various locations, such as two port injectors, one port injector and one direct injector (as shown in FIG. 1), or others. A controller may be configured to perform a routine, such as the example routines of FIGS. 3-5, to confirm the need for an injector calibration, diagnose a fuel injector and correct a measured pressure drop. Examples of fuel injection timing and corresponding drops in fuel rail pressure are illustrated in FIGS. 6A and 6B. FIG. 7 portrays the relationship between injection slope and injection pressure while FIG. 8 illustrates the importance of correcting measured pressure drops for closing delay and other factors.

FIG. 1 shows a schematic depiction of a spark ignition internal combustion engine 10 with a dual injector system, where engine 10 has both direct and port fuel injection. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors 66 and 67. Fuel injector 67 is shown directly coupled to combustion chamber 30 for delivering injected fuel directly therein in proportion to the pulse width of signal DFPW received from controller 12 via electronic driver 68. In this manner, fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may improve mixing and combustion due to the lower volatility of some alcohol based fuels. Alternatively, the injector may be located overhead and near the intake valve to improve mixing.

Fuel injector 66 is shown arranged in intake manifold 43 in a configuration that provides what is known as port injection of fuel (hereafter referred to as "PFI") into the intake port upstream of cylinder 30 rather than directly into cylinder 30. Fuel injector 66 delivers injected fuel in proportion to the pulse width of signal PFPW received from controller 12 via electronic driver 68. Note that a single driver 68 may be used for both fuel injection systems, or multiple drivers may be used.

Fuel may be delivered to fuel injectors 66 and 67 by a high pressure fuel system 200 including a fuel tank, fuel pumps, and fuel rails (not shown). Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 91 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66 during a compression stroke. In another example, a homogenous mixture may be formed by operating one or both of injectors 66 and 67 during an intake stroke (which may be open valve injection). In yet another example, a homogenous mixture may be formed by operating one or both of injectors 66 and 67 before an intake stroke (which may be closed valve injection). In still other examples, multiple injections from one or both of injectors 66 and 67 may be used during one or more strokes (e.g., intake, compression, exhaust, etc.). Even further examples may be where different injection timings and mixture formations are used under different conditions, as described below.

Controller 12 can control the amount of fuel delivered by fuel injectors 66 and 67 so that the homogeneous, stratified, or combined homogenous/stratified air/fuel mixture in chamber 30 can be selected to be at stoichiometry, a value rich of stoichiometry, or a value lean of stoichiometry.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 58 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

FIG. 2 illustrates a dual injector, dual fuel system 200 with a high pressure dual fuel rail system which may be the fuel system coupled to engine 10 in FIG. 1, for example. Fuel system 200 may include fuel tanks 201a and 201b, low pressure (or lift) fuel pumps 202a and 202b that supply fuel from the fuel tanks 201a and 201b to high pressure fuel pumps 206a and 206b via low pressure passages 204a and 204b, respectively. The high pressure fuel pumps 206a and 206b supply pressurized fuel to the high pressure fuel rails 210a and 210b via high pressure passages 208a and 208b, respectively. The high pressure fuel rail 210a supplies pressurized fuel to fuel injectors 214a, 214b, 214c, and 214d and the high pressure fuel rail 210b supplies pressurized fuel to fuel injectors 214e, 214f, 214g, and 214h. The fuel injectors inject fuels into engine cylinders 212a, 212b, 212c, and 212d located in an engine block 216. Un-injected fuel may be returned to the fuel tanks 201a and 201b via respective fuel return passages (not shown). The engine block 216 may be coupled to an intake pathway 222 with an intake air throttle 224.

Each cylinder, thus, can receive fuel from two injectors where each injector either supplies a fuel different from the other or the two injectors are placed in different locations. For example, as discussed earlier in FIG. 1, one injector may be configured as a direct injector coupled so as to fuel directly into a combustion chamber while the other injector is configured as a port injector coupled to the intake manifold and delivers fuel into the intake port upstream of the intake valve.

The system may further include a control unit 226. Control unit 226 may be an engine control unit, powertrain control unit, control system, a separate unit, or combinations of various control units. The control unit 226 is shown in FIG. 2 as a microcomputer, including an input/output (I/O) port 228, a central processing unit (CPU) 232, an electronic storage medium for executable programs and calibration values shown as read only memory (ROM) chip 230 in this particular example, random access memory (RAM) 234, keep alive memory (KAM) 236, and a data bus.

Similar to control unit 12 in FIG. 1, control unit 226 may be further coupled to various other sensors 252 and various actuators 254 (e.g., fuel injection actuator, spark ignition actuator, throttle valve actuator, etc.) for sensing and controlling vehicle operating conditions. For example, the control unit 226 may receive fuel pressure signals from the high pressure fuel rails 210a and 210b via respective fuel pressure sensors 220a and 220b located in the high pressure fuel rails 210a and 210b. The control unit 226 may also control operations of intake and/or exhaust valves or throttles, engine cooling fan, spark ignition, injector, and fuel pumps to control engine operating conditions.

The control unit may further receive throttle opening angle signals indicating the intake air throttle position via a throttle position sensor 238, intake air flow signals from a mass air flow sensor 240, engine speed signals from engine speed sensor 242, accelerator pedal position signal from a pedal 244 via an accelerator pedal position sensor 246, crank angle sensor 248, and engine coolant temperature (ECT) signals from engine temperature sensor 250.

In addition to the signals mentioned above, the control unit 226 may also receive other signals from various other sensors 252. For example, the control unit 226 may receive a profile ignition pickup signal (PIP) from a Hall effect sensor (not shown) coupled to a crankshaft and a manifold pressure signal MAP from a manifold pressure sensor, as shown in FIG. 1.

The control unit 226 may control operations of various vehicular components via various actuators 254. For example, the control unit 226 may control the operation of the fuel injectors 214a-h through respective fuel injector actuators (not shown) and high pressure fuel pumps 206a and 206b through respective high pressure fuel pump actuators (not shown).

The high pressure fuel pumps 206a and 206b may be coupled to and controlled by the control unit 226 as shown in FIG. 2. The control unit 226 may regulate the amount or speed of fuel to be fed into the high pressure rails 210a and 210b by the high pressure fuel pumps 206a and 206b through respective high pressure fuel pump controls (not shown). The control unit 226 may also completely stop fuel supply to the high pressure fuel rails 210a and 210b. Furthermore, the high pressure fuel pumps 206a and 206b may contain one or more relief valves that decrease the fuel pressure in the high pressure fuel rails when the fuel pressure in the high pressure fuel rails 210a and 210b is higher than desired.

Although the injectors are coupled to engine cylinders in this example, in other examples, the injectors may be coupled to an intake pathway. The fuel injectors that are directly coupled to engine cylinders may be located overhead of cylinder pistons (not shown) or located on the side of an engine cylinder. Injectors 214a-h may be operatively coupled to and controlled by a control unit, such as the control unit 226, as is shown in FIG. 2. An amount of fuel injected from the injector and the injection timing may be determined by the control unit 226 from an engine map stored in the control unit 226 on the basis of engine speed and/or intake throttle angle, or engine load. The injector may be controlled via an electromagnetic valve coupled to the injector (not shown). The injector may not inject all the fuel supplied to the injector and may return part of the fuel supplied to the fuel tank through a return path, such as a return passage (not shown).

High pressure fuel rails 210a and 210b may also contain one or more temperature sensors for sensing the fuel temperature in the high pressure fuel rails 210a and 210b and one or more pressure sensors for sensing the fuel pressure in the high pressure fuel rails 210a and 210b. They may also contain one or more relief valves that when opened decrease the pressure in the high pressure fuel rails when it is greater than desired and return extra fuel back to the fuel tank via a fuel return passage.

Various other modifications or adjustments may be made to the above example systems. For example, the fuel passages (e.g., 204a, 204b, 208a, and 208b) may contain one or more filters, pumps, pressure sensors, temperature sensors, and/or relief valves. The fuel passages may include one or multiple lines. There may be one or more fuel cooling systems. The intake pathway 222 may contain one or more air filters, turbochargers, and/or surge tanks. The engine may contain one or more engine cooling fans, cooling circuits, spark ignitions, valves, and controls. The engine may be coupled to an exhaust pathway.

In this way, it is possible to control the fueling of individual cylinders or groups of cylinders. Additionally, one injector may be isolated for calibration while the other cylinders continue to receive fuel from other injectors, thereby, leaving engine operation significantly unaffected during calibration. Further, any changes in fuel rail pressure (FRP) during calibration may be monitored by pressure sensors coupled to the fuel rails allowing for an evaluation of injector performance.

Figure 3:
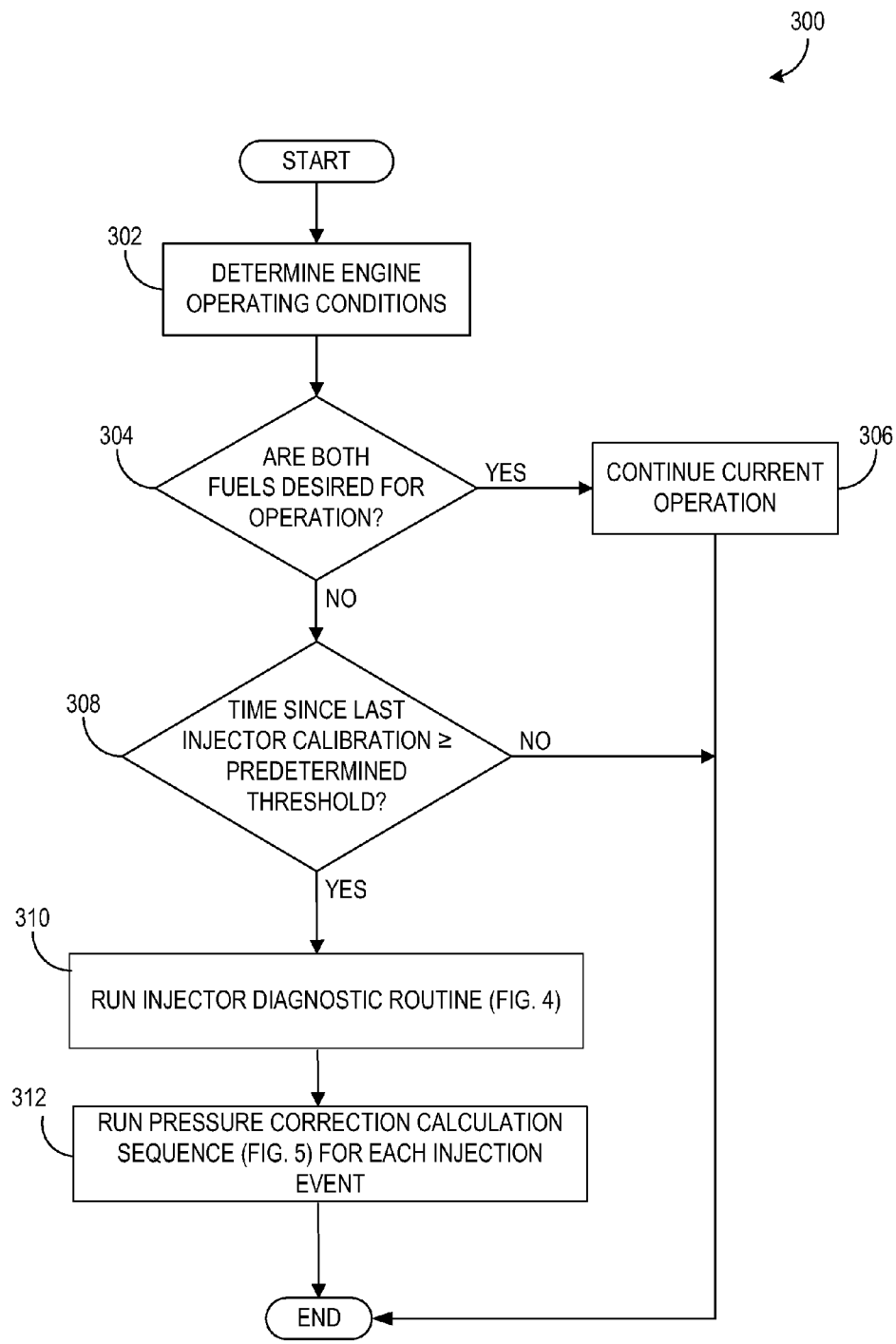
FIG. 3 is an example flowchart illustrating a routine that confirms the need of an injector calibration event and performs it based on certain conditions.
Figure 4:
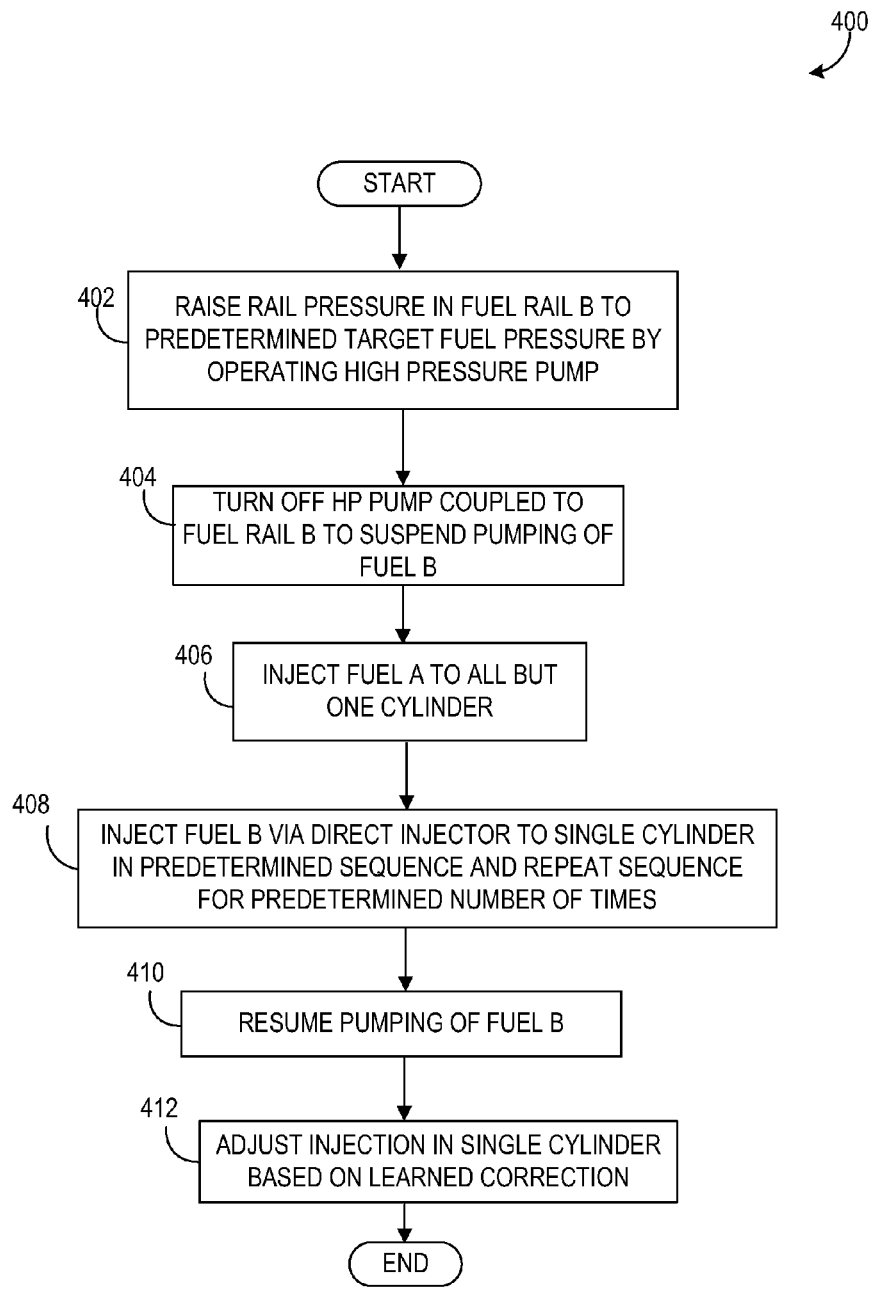
FIG. 4 presents a flowchart demonstrating an example fuel injector diagnostic routine.
Figure 5:
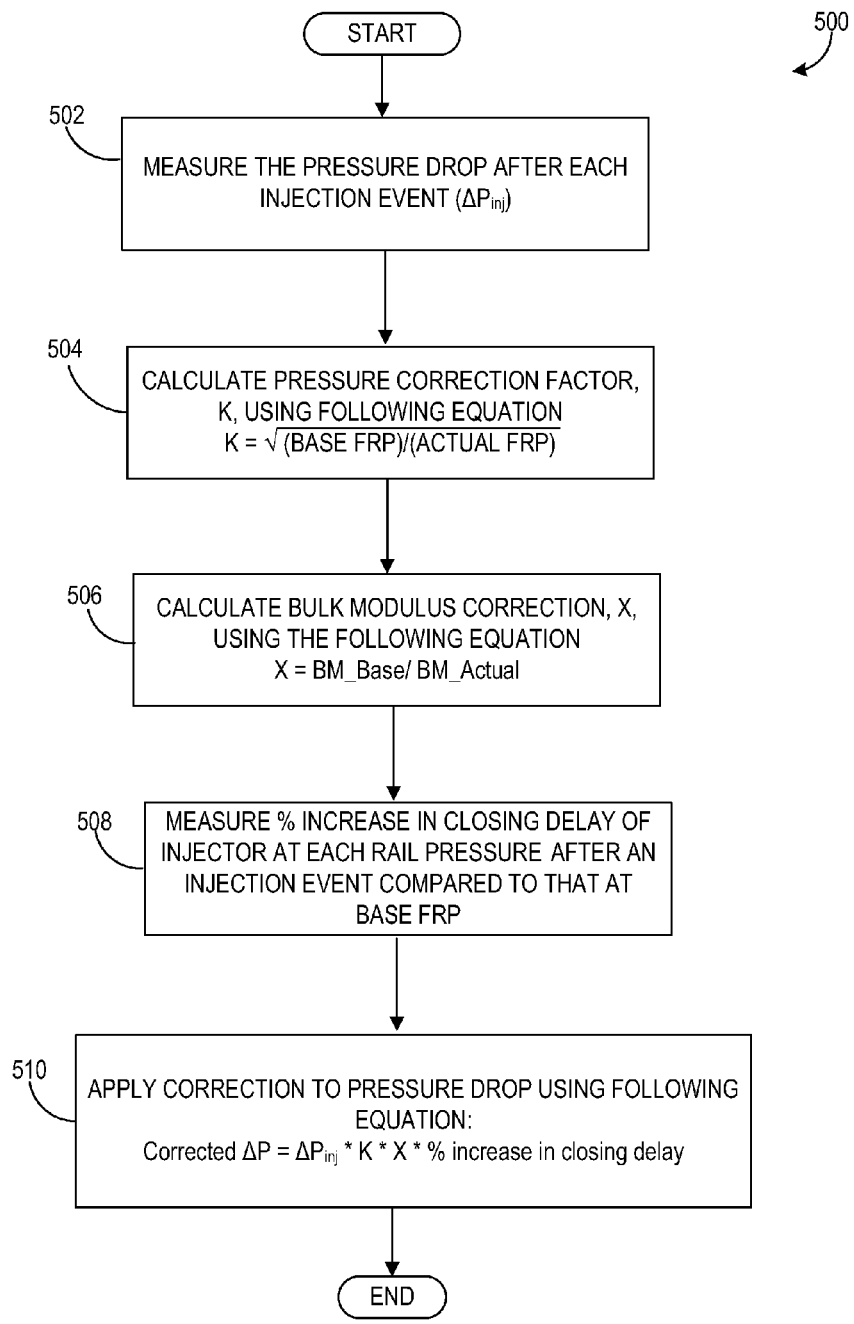
FIG. 5 is a flowchart depicting an example fuel rail pressure drop correction routine.

Example routines that may be performed by controller 12 are shown in FIGS. 3-5. Routine 300 in FIG. 3 verifies whether an injector diagnostic can be performed based on engine operating conditions. Meanwhile, routine 400 in FIG. 4 performs a fuel injector diagnostic while routine 500 in FIG. 5 modifies a measured pressure drop in fuel rail pressure (FRP) for an increase in injector closing delay and other corrections.

In FIG. 3, a routine 300 determines if an injector diagnostic routine should be run based on existing engine operating conditions. Specifically, routine 300 determines if a diagnostic routine is desired based on which fuels are required for engine operation and an amount of time since the last injector calibration. For example, during conditions in which both fuels are needed, a diagnostic routine may not be run since injection of one of the fuels is suspended during calibration.

At 302 of routine 300, engine operating conditions are determined. Engine operating conditions may include load, temperature, speed, etc.

Once the engine operation conditions are verified, routine 300 proceeds to 304 where it is confirmed if both fuels are desired for engine operation. For example, if the engine is operating at high load, injection of both fuels may be desired in order to continue operating at high load. As another example, the engine may be operating under low load conditions and the engine may operate using one or both fuels.

If it is determined that both fuels are desired, routine 300 moves to 306 where the routine ends while engine operation continues. On the other hand, if it is ascertained that both fuels are not desired for operation (e.g., one or both fuels may be used, but both fuels are not needed for optimum engine efficiency), routine 300 continues to 308 where it is assessed if the time since the last injector calibration is greater than or equal to a predetermined threshold. As examples, injector calibration may be desired one or more times per drive cycle, every other drive cycle, or after a predetermined number of miles is driven.

If the time since the last injector calibration is not greater than or equal to the predetermined threshold, routine 300 ends. In contrast, if the time since the last injector calibration is greater than or equal to the predetermined threshold, routine 300 proceeds to 310 where an injector diagnostic routine is carried out, as will be described below with reference to FIG. 4, followed by a pressure drop correction routine at 312 for each injection event, which will be elaborated in FIG. 5.

Continuing to FIG. 4, a diagnostic routine 400 for fuel injectors is illustrated. Specifically, the fuel rail pressure in one of the rails is first elevated to a preset level, pumping is then suspended and fuel is injected into a single cylinder in order to detect a pressure drop due to the injection. As such, the other fuel rail pump may continue to supply fuel to the other fuel rail and other cylinders of the engine and the diagnostic routine may be carried out using one injector at a time, thereby, maintaining engine efficiency.

At step 402, rail pressure in fuel rail B is increased to a predetermined level by activating a high pressure pump coupled to fuel rail B. By raising the pressure before firing the injector, sufficient fuel is available for correct metering by the injector and for multiple injection events. At 404, the high pressure pump coupled to fuel rail B is shut down, thereby, suspending the pumping of fuel B into fuel rail B. For example, in a dual fuel system, the fuel system may include a first fuel rail (e.g., fuel rail A) coupled to a first fuel pump (e.g., fuel pump A) which pumps a first fuel (e.g., fuel A) into the first fuel rail and a second fuel rail (e.g., fuel rail B) coupled to a second fuel pump (e.g., fuel pump B) which pumps a second fuel (e.g., fuel B) into the second fuel rail. Fuel A and fuel B may be various fuels such as gasoline, ethanol, a gaseous reformate fuel, a blend of gasoline and an alcohol based fuel, a mixture of fuel and water, etc.

After pumping of fuel B is suspended in fuel rail B, injection of fuel A is carried out in all but one of the cylinders of the engine at 406. For example, if pumping of fuel B is suspended in fuel rail B, fuel A is injected to all but a single cylinder. As an example, in a four cylinder engine, fuel A may be injected to cylinders 2, 3, and 4, but not cylinder 1. In another example, fuel A may be added via port injectors into the intake ports of cylinders 2, 3, and 4 while the port injector in cylinder 1 is maintained inoperative to calibrate the direct injector in cylinder 1.

Next, at 408, while the pumping of fuel B is suspended in fuel rail B and the injection of fuel A is carried out in all but a single cylinder of the engine, fuel B is injected to the single cylinder. In one example, fuel B may be delivered via a direct injector coupled to a combustion chamber. In other examples, fuel B may be injected to the single cylinder in a predetermined sequence for a predetermined number of times. FIG. 6A shows an example injector calibration in which only one injector is fired in a predetermined sequence.

Since pumping has been suspended in fuel rail B, the amount of fuel, and thus the fuel rail pressure (FRP), decreases with each injection. The pressure drop is measured at each injector fueling event and corrected for injector closing delay, as will be detailed in FIG. 5. Once it is determined that the injector calibration event is done, pumping of fuel B is resumed at step 410 and at step 412, the amount of fuel injected to the single cylinder by the calibrated injector is adjusted based on the learned correction. For example, if the amount of fuel injected by an injector is more than desired, the injector is calibrated such that less fuel is injected per injection (e.g., the injection is compensated by a correction coefficient) in order to compensate for the injector degradation and maintain the efficiency of the system. In another example, updates to an injector slope and offset (between pulsewidth and an amount of fuel injected at a given rail pressure) may be made based on the learned correction. Each fuel injector may have its own learned correction factor, such that degradation over time of each fuel injector can be tracked and compensated.

It will be appreciated that while a diagnostic routine described above is specified for a direct injector, a similar diagnostic routine can be carried out for a port injector in a single cylinder. For example, in a 4 cylinder engine, a high pressure fuel pump continues to pump fuel into fuel rail A coupled to direct injectors firing into 3 cylinders while fueling in rail B is raised to a predetermined pressure, pumping is shut down and a single port injector coupled to a single unfueled cylinder may be isolated and calibrated.

FIG. 5 depicts an example routine 500 which illustrates the correction for injector delay and other corrections applied to a measured pressure drop. At 502, a pressure difference is measured based on signals from a pressure sensor coupled to the fuel rail. The difference in FRP before injector firing and FRP after injector firing is calculated as $\Delta P_{inj}$. An example pressure difference measurement will be described in reference to FIGS. 6A and 6B below.

An example of fuel injection timing is depicted at plot 600 and corresponding fuel pressure change in a fuel rail during an injector diagnostic routine in a four cylinder engine is illustrated at plot 610. Prior to the start of an injector diagnostic routine at 602, the fuel pressure in the fuel rail is maintained at a normal operating pressure $P_O$, as shown in plot 610, and normal pump strokes are issued. As shown in plot 600, all injectors coupled to fuel rail B are operating normally prior to the start of the diagnostic routine at 602. At the start of the injector diagnostic routine, fuel rail pressure in the fuel rail is increased (e.g., via more or larger pump strokes) to a predetermined level $P_d$ before pumping is suspended and an injector coupled to cylinder 1 is activated. For example, cylinder 1 may receive fuel from a direct injector which injects the fuel directly into the combustion region. In another example, cylinder 1 may be fueled via a port injector placed upstream of the intake valve in the intake manifold. As shown in plot 610, for each injection, the pressure in the fuel rail drops and is measured as a difference ($\Delta P_{inj}$) between $P_1$, the pressure before an injection event, and $P_2$, the pressure immediately after that injection event. An average of multiple pressure readings prior to and after an injection event may be estimated for higher precision while calculating the pressure drops.

Additionally, as the duration of a calibration event increases, the decrease in total pressure in the fuel rail from start to finish can be significant. For example, in plot 610, the decline in pressure from $P_d$ to $P_f$ can be substantial when calibration is performed over a longer period of time. In such situations, the effect of various factors such as closing delay, opening delay, and others, on measured pressure drops at later injections can be substantial as will be elaborated further in the description for FIG. 8.

Returning to routine 500, at 504 a pressure correction factor, K, is calculated using the following equation:

$$K = \sqrt{(\text{BASEFRP})/(\text{ACTUALFRP})}$$

Where,

Base FRP is a fuel rail pressure at which a base bulk modulus is defined,

Actual FRP is the FRP after an injection event

The above calculation is based on a relationship between pressure difference ($\Delta P$) and volume flow rate and square root of FRP.

At 506, a bulk modulus correction, X, is determined based on the following:

$$X = \text{BM\_Base}/\text{BM\_Actual}$$

where,

BM_Base is the bulk modulus at base FRP

BM_Actual is the bulk Modulus at actual FRP

Thus, it can be observed that base modulus correction, X, increases as BM_actual decreases.

Next at step 508, a percentage increase in closing delay is measured at each rail pressure as FRP decreases after at each injection. Specifically, after each injection, the change in closing delay at that rail pressure is compared to a closing delay at base FRP and a percentage increase is calculated.

Injector closing delay is described further in reference to FIG. 7 and plot 700 which portrays a relationship between injection slope and injector pressure. Injector pressure is the pressure across an injector and as such, a differential pressure between fuel rail pressure (FRP) and the pressure within the intake manifold or the cylinder. Injector slope is the slope of a plot of fuel mass versus time and therefore, is the change in flow rate. Injector closing delay is a function of injector pressure and injector slope. For example, injector closing delay increases with a decrease in injector pressure. A high pressure within an intake manifold, possibly during boosted conditions, can increase closing delay by offering resistance to the closure of the injector. In another example, a reduction in fuel rail pressure decreases the backpressure that an injector is exposed to and therefore, increases injector closing delay.

Returning now to routine 500, at step 510 a corrected pressure drop is calculated using the following equation:

$$\Delta P_{corrected} = \Delta P_{inj} * K * X * D$$

Where, $\Delta P_{inj}$=Pressure before injection event−Pressure after injection event (for e.g., $P_1 - P_2$ from plot 610)

K=Pressure correction

X=Bulk modulus correction

D=percentage increase in closing delay at actual rail pressure after injection event from that at base FRP Thus, a measured pressure drop after each injection event is modified for an increase in closing delay of the injector at that rail pressure as well as corrected for pressure and bulk modulus.

Turning to FIG. 8, an example comparison of corrected and uncorrected pressure drops with an increasing number of injection events is illustrated. Plot 802 depicts corrected pressure changes and plot 804 represents uncorrected pressure drops. As described earlier for plot 610, if a calibration event is performed long enough to cause a considerable decline in FRP from Pd to Pf, the effect of factors such as closing delay become significant. As shown in FIG. 8, as the number of injection events rises, plot 802 for corrected pressure drops shows a minimal change in ΔP from the first injection until the end of injection events. On the other hand, plot 804, for uncorrected pressure drops, declines more sharply indicating erroneously that drops in rail pressure reduce with an increasing number of injection events. Thus, as the number of injector events rise, it becomes more important to adjust a measured pressure drop for increases in closing delay.

For example, referring to plot 610 in FIG. 6B, the injector closing delay at $P_5$ is greater than that at $P_2$ because fuel rail pressure at $P_5$ (post injection) is less than rail pressure $P_2$. As described earlier in reference to FIG. 7, injector closing delay, being a function of injector pressure, increases as fuel rail pressure and injector backpressure decrease. Therefore, a percentage increase in closing delay at rail pressure $P_5$ compared to that at base fuel rail pressure may be more than a similar percentage closing delay increase at rail pressure $P_2$. Thus, an injector closing delay correction for a measured pressure drop at $P_5$ may be larger than a similar correction needed for a measured pressure drop at $P_2$. Likewise, the increase in closing delay, and a corresponding correction, at $P_f$ may be substantially higher than that at rail pressure $P_1$.

As discussed earlier for plot 802, a measured pressure drop corrected for injector closing delay can provide a more accurate indication of the reduction in fuel rail pressure thereby, leading to a more precise adjustment in fuel delivered by an injector after a calibration event. Referring again to plot 610 in FIG. 6B, if the calibration event were to stop after a relatively short time interval, for example, at fuel rail pressure $P_2$, the rail pressure drop may be less affected by closing delay. The difference in corrected pressure drop and uncorrected pressure drop may be minimal and any learned correction to the injector may, therefore, be similar. In one example, the corrected pressure drop at $P_2$ may be comparable to an expected pressure drop and injector fueling may remain the same after calibration without any adjustment. However, if the calibration event were carried on until $P_f$, where the fuel rail pressure has dropped significantly with a correspondingly larger increase in injector closing delay, the corrected pressure drop may be substantially different from a measured pressure drop. For example, the corrected pressure drop may denote a larger decrease in pressure than measured indicating that excess fuel may be injected into the combustion chamber. Based on this learning, the injector being calibrated may be adjusted to operate with a smaller pulse width.

In this way, piece-to-piece variability in fuel injectors can be analyzed and corrected for in a dual fuel, multi-injector system. A fuel injector can be more precisely calibrated by correcting each measured fuel rail pressure drop for a corresponding increase in injector closing delay. This correction may be more crucial for a calibration event performed over longer durations. By accommodating increases in closing delay, corrected pressure drops can lead to a more accurate interpretation of injector performance and thereby, improve engine operation.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling fuel injection of a multi-injector-per-cylinder engine including first and second rails, comprising:
when only a single injector-per-cylinder is determined by a controller to be enabled:
injecting a first fuel to all but a single cylinder of the engine;
injecting, via an injector, a second fuel into the single cylinder; and
indicating injector degradation in response to a magnitude of pressure drop in the second rail and a determined correction for closing delay of the injector.

2. The method of claim 1, further comprising:
before injecting the second fuel:
raising fuel rail pressure of the second rail; and
suspending pump operation of a fuel pump coupled only to the second rail;
wherein the determined correction for the closing delay of the injector includes a percentage increase in delay at each rail pressure drop compared to a base fuel rail pressure.

3. The method of claim 2, wherein the correction for the closing delay increases with decreasing fuel rail pressure.

4. The method of claim 1, wherein the engine includes a port fuel injector and a direct fuel injector for each engine cylinder.

5. The method of claim 4, wherein the second fuel is injected into the single cylinder through a direct injector while the remaining cylinders are fueled with the first fuel via port injectors.

6. The method of claim 3, wherein the degradation is further based upon a pressure drop corrected for pressure and bulk modulus, wherein the correction increases as actual bulk modulus decreases.

7. A method for controlling fuel injection of a multi-injector, dual fuel engine which includes first and second fuel rails, comprising:
when dual-fuel operation is not needed:
performing a calibration event including:
injecting a first fuel via port injectors to all but one cylinder of the engine; and
while pumping is suspended in the second fuel rail, injecting a second fuel via a direct injector into the one remaining cylinder; and
if the calibration event is performed long enough to cause a decline in rail pressure from a first level to a second level, then correlating magnitudes of pressure drops corrected for an injector closing delay to injector degradation.

8. The method of claim 7, further comprising:
before suspending pump operation coupled to the second fuel rail:
increasing pressure in the second fuel rail to a preset level;
wherein, the injector closing delay correction increases with a decrease in fuel rail pressure.

9. The method of claim 8, wherein an increase in closing delay of an injector is measured as a percentage increase from closing delay at a base fuel rail pressure.

10. The method of claim 7, further comprising:
correcting fuel rail pressure drop at each injection event for pressure and bulk modulus, and adjusting subsequent fuel injection based on the corrected fuel rail pressure drop.

11. The method of claim 7, wherein fuel injection of the second fuel in the one cylinder is adjusted based on the corrected pressure drops once pumping of the second fuel is resumed by a second pump.

12. The method of claim 7, wherein the first fuel is gasoline and the second fuel is ethanol.

13. A system for an engine in a vehicle, comprising:
a plurality of cylinders, each cylinder having a first and a second injector where the first injector is coupled to a first fuel rail and the second injector is coupled to a second fuel rail; and
a control system comprising a computer readable storage medium, the medium comprising instructions for:
during a first condition, injecting fuel to all cylinders via the first injectors; and
during a second condition when both fuels are not needed:
injecting fuel to all but one cylinder via the first injectors;
operating a high pressure pump coupled to the second injectors to elevate fuel rail pressure to a predetermined level;
suspending pumping of fuel into the second fuel rail while continuing pumping of fuel into the first fuel rail;
injecting fuel to the one cylinder via only the second injector; and
indicating injector degradation based on a magnitude of fuel rail pressure drop corrected for closing delay.

14. The system of claim 13, wherein the first injectors inject a first fuel and the second injectors inject a second fuel.

15. The system of claim 13, wherein the first injectors are configured as port injectors and the second injectors are configured as direct injectors.

16. The system of claim 13, wherein the first condition includes operating conditions in which only one fuel is used and a diagnostic routine is not being carried out.

17. The system of claim 14, wherein the second condition includes operating conditions in which both fuels are used and a diagnostic routine is being carried out.

18. The system of claim 13, further comprising instructions for, during a third condition, injecting all cylinders via the first and second injectors.

19. The system of claim 13, wherein the fuel rail pressure drop is corrected by an amount based on an increase in injector closing delay calculated as a percentage change in closing delay at each rail pressure compared to a base rail pressure.

20. The system of claim 19, wherein a closing delay correction of an injector increases as fuel rail pressure decreases.

* * * * *